US010976212B2

(12) United States Patent
Kawasaki

(10) Patent No.: US 10,976,212 B2
(45) Date of Patent: Apr. 13, 2021

(54) LEAK INSPECTION ASSISTANCE DEVICE AND LEAK INSPECTION METHOD USING SAME

(71) Applicant: AIREX CO., LTD., Nagoya (JP)

(72) Inventor: Koji Kawasaki, Nagoya (JP)

(73) Assignee: AIREX CO., LTD.

( * ) Notice: Subject to any disclaimer, the term of this patent is extended or adjusted under 35 U.S.C. 154(b) by 148 days.

(21) Appl. No.: 16/343,368

(22) PCT Filed: Oct. 3, 2017

(86) PCT No.: PCT/JP2017/035895
§ 371 (c)(1),
(2) Date: Apr. 18, 2019

(87) PCT Pub. No.: WO2018/092441
PCT Pub. Date: May 24, 2018

(65) Prior Publication Data
US 2019/0265122 A1    Aug. 29, 2019

(30) Foreign Application Priority Data

Nov. 16, 2016 (JP) ............................. JP2016-223199

(51) Int. Cl.
*G01M 3/02* (2006.01)
*B01D 46/00* (2006.01)
(Continued)

(52) U.S. Cl.
CPC ............ *G01M 3/02* (2013.01); *B01D 46/009* (2013.01); *B01D 46/42* (2013.01); *B01D 46/442* (2013.01);
(Continued)

(58) Field of Classification Search
CPC ............ B01D 2273/18; B01D 46/0086; G01N 2015/084; G01N 15/0806; G01N 15/08; G01N 2001/2291
See application file for complete search history.

(56) References Cited

U.S. PATENT DOCUMENTS 3,765,225 A * 10/1973 Rivers ................... G01M 3/20
    73/40.7
4,324,568 A * 4/1982 Wilcox ............. B01D 46/0013
    239/514
(Continued)

FOREIGN PATENT DOCUMENTS

DE    102011089856 A1 *  6/2013
JP      S59-10831 A  *  1/1984
(Continued)

OTHER PUBLICATIONS

Machine Translation of JP-2005300263 Which Originally Published on Oct. 27, 2005. (Year: 2005).*
(Continued)

*Primary Examiner* — David A. Rogers
(74) *Attorney, Agent, or Firm* — Yakov Sidorin; Quarles & Brady LLP

(57) ABSTRACT

Provided are a leak inspection assistance device and a leak inspection method using the same which enable using a normal leak inspection device in a leak inspection of filters in a clean room, have a small cost burden since a scanning robot, large-scape equipment, an incidental work, and the like are not required, and enable performing the accurate leak inspection with a small number of workers.

A projection device which projects a suction point of a suction probe adjunct to a leak inspection device which performs a leak inspection onto a surface of a filter in a clean room in such a manner that the suction point moves in X-Y axis directions orthogonal to each other along the surface of
(Continued)

the filter at a fixed interval and a fixed speed is provided, and a worker uses the suction probe for scanning in accordance with movement of the suction point.

8 Claims, 7 Drawing Sheets

(51) Int. Cl.
  *B01D 46/44* (2006.01)
  *B01D 46/46* (2006.01)
  *B01D 46/42* (2006.01)
  *G01N 15/08* (2006.01)
  *G01M 3/00* (2006.01)

(52) U.S. Cl.
  CPC .............. *B01D 46/46* (2013.01); *G01M 3/00* (2013.01); *G01N 15/08* (2013.01); *B01D 2273/18* (2013.01)

(56) References Cited

U.S. PATENT DOCUMENTS

| | | | | |
|---|---|---|---|---|
| 4,494,403 | A * | 1/1985 | Bowers | B01D 46/0006 73/40.7 |
| RE31,952 | E * | 7/1985 | Wilcox | B01D 46/0004 239/514 |
| 4,683,762 | A * | 8/1987 | Aurich | G01M 3/20 73/40.7 |
| 4,875,360 | A * | 10/1989 | Ziemer | G01M 3/20 73/40.7 |
| 5,237,384 | A * | 8/1993 | Fukunaga | G01C 15/002 356/139.06 |
| 6,480,271 | B1 * | 11/2002 | Cloud | G01C 15/02 356/140 |
| 7,010,960 | B1 * | 3/2006 | Grantham | G01M 3/00 73/40 |
| 7,191,651 | B2 * | 3/2007 | Douglas | G01M 1/02 353/13 |
| 7,334,490 | B2 * | 2/2008 | Morse | G01N 15/0806 73/865.9 |
| 7,552,621 | B2 * | 6/2009 | Morse | G01N 15/0806 73/38 |
| 7,658,787 | B2 * | 2/2010 | Morse | B01D 46/0086 95/273 |
| 7,669,490 | B2 * | 3/2010 | Yoshitome | F24F 3/161 73/865.8 |
| 7,739,926 | B2 * | 6/2010 | Morse | G01N 15/08 73/865.9 |
| 7,758,664 | B2 * | 7/2010 | Morse | B01F 5/0603 55/385.2 |
| 7,882,727 | B2 * | 2/2011 | Morse | G01N 15/0806 73/38 |
| 8,210,056 | B2 * | 7/2012 | Pike | F01D 17/08 73/863 |
| 8,549,895 | B2 * | 10/2013 | Chung | B01D 46/46 73/40.7 |
| 9,234,830 | B2 * | 1/2016 | Li | G01N 15/082 |
| 10,180,384 | B2 * | 1/2019 | Verma | G01N 15/0806 |
| 10,213,921 | B2 * | 2/2019 | Meier | B25J 9/1694 |
| 10,255,671 | B1 * | 4/2019 | Zmijewski | G06T 7/001 |
| 10,272,375 | B2 * | 4/2019 | Choi | B01D 39/18 |
| 10,578,521 | B1 * | 3/2020 | Dinakaran | G01N 1/2205 |
| 10,663,388 | B2 * | 5/2020 | Pedalino | F24F 3/1603 |
| 2002/0057830 | A1 * | 5/2002 | Akin | G01R 31/309 382/147 |
| 2002/0134910 | A1 * | 9/2002 | Kokubu | G01N 21/8806 250/205 |
| 2006/0042359 | A1 * | 3/2006 | Morse | G01M 3/3281 73/40 |
| 2006/0272301 | A1 * | 12/2006 | Morse | B01D 46/444 55/439 |
| 2007/0214870 | A1 * | 9/2007 | Morse | G01N 15/0806 73/37 |
| 2010/0154513 | A1 * | 6/2010 | Lin | B01D 46/42 73/38 |
| 2011/0107819 | A1 * | 5/2011 | Chung | B01D 46/46 73/40.7 |
| 2018/0021751 | A1 * | 1/2018 | Singh | G01B 11/14 348/95 |
| 2018/0027218 | A1 * | 1/2018 | Kiso | G05B 19/41805 705/7.14 |
| 2018/0031488 | A1 * | 2/2018 | Waldie | B64F 5/60 |

FOREIGN PATENT DOCUMENTS

| | | | |
|---|---|---|---|
| JP | 2001108606 A | * | 4/2001 |
| JP | 2004-347488 A | | 12/2004 |
| JP | 2005300263 A1 | * | 10/2005 |
| JP | 2011-044789 A | | 3/2011 |
| JP | 2014-219135 A | | 11/2014 |
| JP | 2016-170495 A | | 9/2016 |
| WO | 2016132731 A1 | | 8/2016 |

OTHER PUBLICATIONS

Machine Translation of JP-S59-010831 Which Originally Published on Jan. 20, 1984. (Year: 1984).*
Machine Translation of JP-2001108606 Which Originally Published on Apr. 20, 2001. (Year: 2001).*
Machine Translation of DE-102011089856 Which Originally Published on Jun. 27, 2013. (Year: 2013).*
Machine Translation of JP-2016170495 Which Originally Published on Sep. 23, 2016. (Year: 2016).*
Machine Translation of JP-2014219135 Which Originally Published on Nov. 20, 2014. (Year: 2014).*
Machine Translation of JP-2004347488 Which Originally Published on Dec. 9, 2004. (Year: 2004).*

* cited by examiner

LEAK INSPECTION ASSISTANCE DEVICE AND LEAK INSPECTION METHOD USING SAME

CROSS-REFERENCE TO RELATED APPLICATIONS

This patent application represents the U.S. national stage entry of International Application No. PCT/JP2017/035895, filed on Oct. 3, 2017, and claims priority from Japanese Patent Application No. 2016-223199, filed on Nov. 16, 2016. The disclosure of each of the above-identified patent documents is incorporated by reference herein.

TECHNICAL FIELD

The present invention relates to a leak inspection assistance device which is used together with a leak inspection device in leak inspections of an air cleaning filter installed in a clean environment such as a clean room. Further, the present invention relates to a leak inspection method using the leak inspection assistance device.

BACKGROUND ART

As regards a work performed in a clean atmosphere, e.g., a work in a production process of drugs and medicines or a work in a production process of semiconductors or electronic components, the work is performed in a clean working environment inside of which is maintained in a dust-free/aseptic condition so that contaminant cannot enter from an external environment. As such a working environment, a clean room is generally used. In this clean room, a worker wearing dust-free clothes performs a work.

Clean air is supplied into this clean room from an air supply device through a HEPA filter or a ULPA filter (which will be also simply referred to as a "filter" hereinafter). Consequently, in the clean room, Grade A (The Health, Labor and Welfare Ministry: Aseptic Drug Production Guidelines) or cleanliness conforming thereto required in production of drugs and medicines is guaranteed. To maintain such cleanliness, a leak inspection is periodically carried out to the filter installed in the clean room.

In general, in the leak inspection, fine particle-containing aerosol such as PAO (polyalphaolefin) is put on an upstream side of the filter, and fine particles which have leaked on a downstream side of the filter are detected by a leak inspection device. This leak inspection device includes a suction probe which captures the fine particles and a fine particle detector such as a particle counter which detects the captured fine particles. In an actual leak inspection work, one worker holds the suction probe in his/her hand, and performs scanning in X-Y axis directions on a filter surface. In accordance with this, another worker confirms detection of the fine particles effected by the fine particle detector and a detected quantity (see FIG. 3). Further, when the fine particle detector has detected the fine particles, the worker who is confirming the fine particle detector gives a sign to the worker who is performing scanning with the suction probe. Furthermore, this portion is again confirmed to identify a leak position of the filter.

In such leak inspection directions, since maintaining a scanning speed or a scanning interval of the suction probe constant is difficult, an accuracy of the leak inspection varies, and a possibility of overlooking the leak is high. Moreover, at least two persons or more are required as the workers, which leads to a large-scale work performed by multiple persons. On the other hand, in the following Patent Literature 1, an automatic leak test device in which a scanning robot which moves a suction probe in the X-Y axis directions at a constant speed is arranged on the downstream side of the filter is suggested. Additionally, in the following Patent Literature 2, a leak inspection device which has been provided by improving and developing the automatic leak test device in the following Patent Literature 1 is suggested. Further, in the following Patent Literature 3 and the following Patent Literature 4, a leak inspection system and an automatic leak test system in which a scanning robot is fixed on an entire ceiling surface of a clean room in advance are suggested.

CITATION LIST

Patent Literatures

Patent Literature 1: Japanese Unexamined Patent Application Publication No. Sho 59-010831
Patent Literature 2: Japanese Unexamined Patent Application Publication No. 2001-108606
Patent Literature 3: Japanese Unexamined Patent Application Publication No. 2005-300263
Patent Literature 4: Japanese Unexamined Patent Application Publication No. 2014-219135

DISCLOSURE OF INVENTION

Problem to be Solved by the Invention

Meanwhile, both the automatic leak test device and the leak inspection device suggested in Patent Literature 1 and Patent Literature 2 described above can maintain the scanning speed or the scanning interval constant. Further, they can be advantageously treated by one worker who operates the scanning robot. However, the scanning robot must be prepared in advance, thus resulting in a considerable cost burden. Furthermore, designing or adjustment must be performed in accordance with a position/size of the filter in the clean room where the leak inspection is carried out. Moreover, a work to arrange the scanning robot to each filter in the clean room is required at the time of the leak inspection.

Additionally, in the leak inspection system and the automatic leak test system suggested in Patent Literature 3 and Patent Literature 4 described above, since the scanning device is fixed to the entire ceiling surface in advance, the work to arrange the scanning robot to each filter in the clean room is not required at the time of the leak inspection. However, these systems require large-scale equipment and an incidental work in the clean room, which leads to a further considerable cost burden.

Therefore, it is an object of the present invention to provide a leak inspection assistance device and a leak inspection method using the same which can cope with the various problems, use a normal leak inspection device in a leak inspection of a filter in a clean room, have a small cost burden since a scanning robot, large-scale equipment, an incidental work, and the like are not required, and enable performing an accurate leak inspection with a small number of workers.

Means for Solving Problem

To achieve the object, as a result of keen studies, the present inventors have found out that using a technology of projection mapping to the leak inspection enables coping with the above-described problems, thereby bringing the present invention to completion.

That is, according to the description of claim 1, a leak inspection assistance device of the present invention is a leak inspection assistance device (50) which is used in a leak inspection of one or more filters (20) in a working chamber where the filters are provided on a ceiling wall surface or a sidewall surface and clean air is fed or exhausted from or to an external environment, and the leak inspection assistance device is characterized by including a projection device (51) which projects a suction point (54) of a suction probe (31) adjunct to a leak inspection device (30) which performs the leak inspection onto a surface of each of the filters in such a manner that the suction point moves in X-Y axis directions orthogonal to each other along the surface of the filter at a fixed interval and a fixed speed.

Further, according to the description of claim 2, the the present invention provides the leak inspection assistance device which is described in claim 1, and the leak inspection assistance device is characterized in that leak information (55) detected by a fine particle detector (32) adjunct to the leak inspection device is projected onto the surface of the filter through the projection device.

Furthermore, according to the description of claim 3, the present invention provides the leak inspection assistance device which is described in claim 1 or 2, and the leak inspection assistance device is characterized in that:

the projection device directly or indirectly mounted on a floor surface of the working chamber includes projection correcting means for correcting a positional relationship between the projection device and the surface of the filter provided on the ceiling wall surface (11) or the sidewall surface; and in a state where an outline (33b) of a scanning line shown in a projection image (53) projected onto the surface of the filter from a projection window (51b) of the projection device is projected in conformity to an outline (23) of the filter by a function of the projecting correcting means, the suction point is projected onto the surface of the filter.

Moreover, according to the description of claim 4, the present invention provides the leak inspection assistance device which is described in claim 1 or 2, characterized by including:

a filter position detection device (56) which detects a positional relationship between the projection device directly or indirectly mounted on a floor surface of the working chamber and the surface of the filter provided on the ceiling wall surface or the sidewall surface; and an information processing device (52) which calculates directions and distances from a projection window of the projection device to respective positions on an outline of the filter from the detected positional relationship, and performs correction in such a manner that an outline of a scanning line shown in the projection image is projected in conformity to the outline of the filter, and characterized in that, in a state where the outline of the scanning line shown in the projection image is projected in conformity to the outline of the filter by the correction of the image processing device, the suction point is projected onto the surface of the filter.

Additionally, according to the description of claim 5, a leak inspection method of the present invention is a leak inspection method for performing a leak inspection of one or more filters with the use of a leak inspection device in a working chamber where the filters are provided on a ceiling wall surface or a sidewall surface and clean air is fed or exhausted from or to an external environment, the leak inspection device including a fine particle detector and a suction probe connected to the fine particle detector, and the leak inspection method is characterized in that, when the leak inspection assistance device according to any one of claims 1 to 4 is used in scanning of a surface of the filter with the use of the suction device, scanning is performed in such a manner that a suction point projected to move in X-Y axis directions orthogonal to each other along the surface of the filter at a fixed interval and a fixed speed is tracked by the suction probe.

Effect of the Invention

According to the above-described configuration, the leak inspection assistance device of the present invention has the projection device. This projection device projects the suction point of the suction probe onto the surface of the filter provided on the wall surface of the working chamber. The suction point projected onto the surface of the filter moves along the surface of the filter in the X-Y axis directions orthogonal each other at a fixed interval and a fixed speed. At this moment, what is required for a worker who performs the leak inspection is enabling the suction probe to travel in accordance with the movement of the suction point.

Consequently, the suction probe can be moved along the surface of the filter at a fixed interval and a fixed speed, and the leak inspection of the filter can be accurately performed. Further, when this leak inspection assistance device is adopted, a normal leak inspection device can be used, and a cost burden of the leak inspection can be reduced without requiring a scanning robot, large-scale equipment, an incidence work, and the like.

Furthermore, according to the above-described configuration, in the leak inspection assistance device of the present invention, leak information detected by the fine particle detector adjunct to the leak inspection device may be projected onto the surface of the filter through the projection device. When the leak information is projected onto the surface of the filter, the same worker can confirm the leak information while performing scanning with the suction probe, and a leak position can be accurately identified. Consequently, in addition to the above-described effect, the accurate leak inspection can be carried out with a small number of workers.

Thus, according to each configuration described above, it is possible to provide the leak inspection assistance device which can use the normal leak inspection device in the leak inspection of the filter in the clean room, has a small cost burden since a scanning robot, large-scale equipment, an incidence work, and the like are not required, and enables performing the accurate leak inspection with a small number of workers.

Further, according to the above-described configuration, in the leak inspection assistance device of the present invention, the projection device has the projection correcting means. This projection correcting means acts to correct a positional relationship between a position of the projection device directly or indirectly mounted on the floor surface of the working chamber and the surface of the filter. This projection correcting means performs the correction in such a manner that an outline of the scanning line shown in a projection image projected onto the surface of the filter from the projection window of the projection device is projected in conformity with the outline of the filter.

When the outline of the scanning line shown in the projection image conforms with the outline of the filter in this manner, the projected suction point can move along the surface of the filter at a fixed interval and a fixed speed. Consequently, even if a position of the projection device directly or indirectly mounted on the floor surface of the working chamber deviates from a position immediately below the filter, the accurate leak inspection can be carried out. Thus, each of the above-described effects can be more specifically exerted.

Further, according to the above-described configuration, the leak inspection assistance device of the present invention has the filter position detection device and the information processing device. The filter position detection device detects a positional relationship between the projection device directly or indirectly mounted on the floor surface of the working chamber and the surface of the filter provided on the ceiling wall surface or the sidewall surface. On the other hand, the information processing device calculates directions and distances from the projection window of the projection device to respective positions on the outline of the filter from the positional relationship detected by the filter position detection device, and performs correction in such a manner that the outline of the scanning line shown in the projection image is projected in conformity with the outline of the filter.

When the outline of the scanning line shown in the projection image conforms with the outline of the filter in this manner, the projected suction point can move along the surface of the filter at a fixed interval and a fixed speed. Consequently, the accurate leak inspection can be performed no matter which position in the working chamber the projection device directly or indirectly mounted on the floor surface of the working chamber is placed at. Thus, each of the above-described effects can be more specifically exerted.

Furthermore, according to the above-described configuration, the leak inspection method of the present invention uses the leak inspection device which has the fine particle detector and the suction probe connected to the fine particle detector. Moreover, this leak inspection method uses the leak inspection assistance device according to any one of claims 1 to 4. Consequently, it is possible to provide the leak inspection method which can use the normal leak inspection device, has a small cost burden since a scanning robot, large-scape equipment, an incidental work, and the like are not required, and can perform the accurate leak inspection with a small number of workers.

Thus, according to the above-described configuration, it is possible to provide the leak inspection method which can use the normal leak inspection device in the leak inspection of the filter in the clean room, has a small cost burden since a scanning robot, large-scale equipment, an incidental work, and the like are not required, and can perform the accurate leak inspection with a small number of workers.

BEST MODE(S) FOR CARRYING OUT THE INVENTION

A description will be first given on a leak inspection method. It is to be noted that described here is a leak inspection method based on a manual operation which is easiest and widely adopted in general. It is to be noted that a special leak inspection method which requires a scanning robot, large-scale equipment, an incidental work, and the like Patent Literature 1 to Patent Literature 4 mentioned above will not be described.

Figure 1:
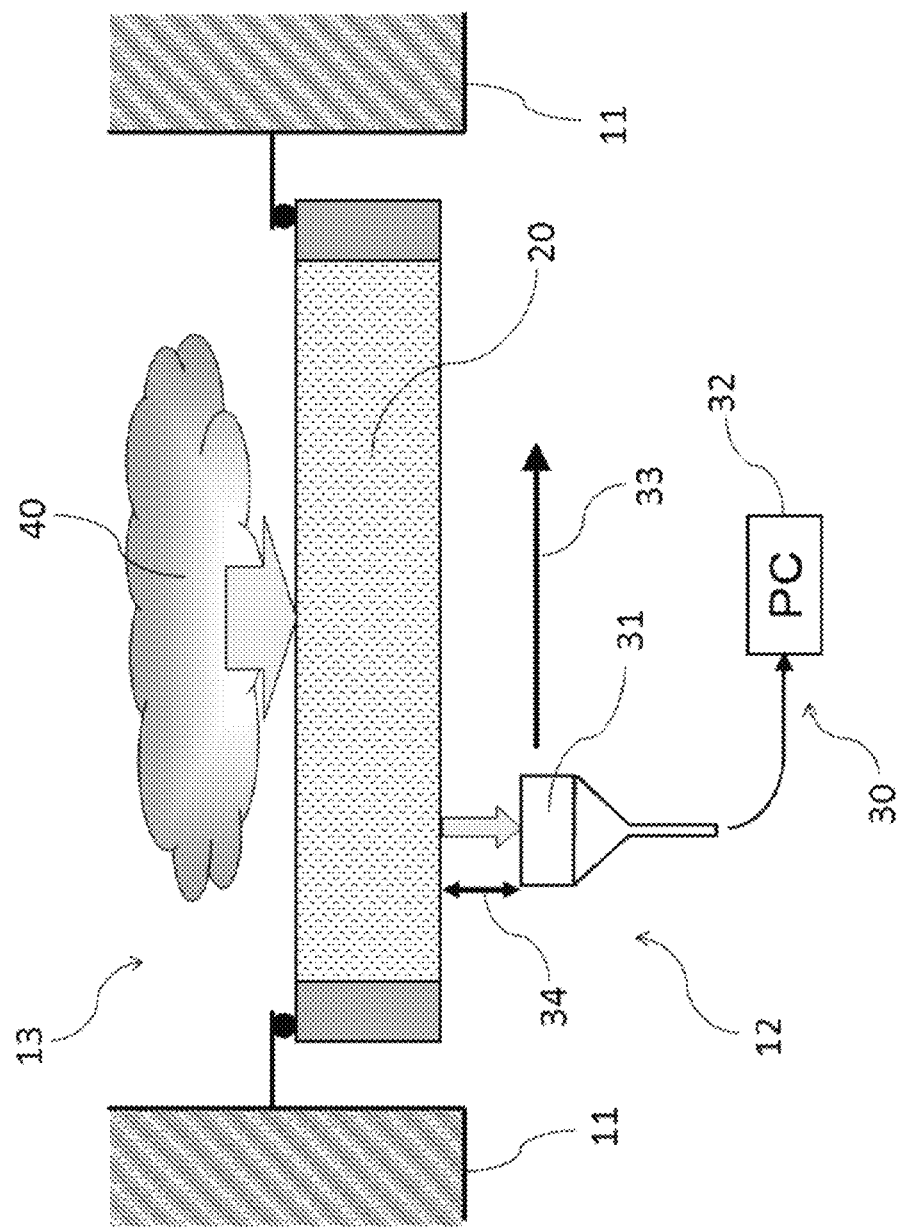
FIG. 1 is a schematic view showing a general leak inspection method.

FIG. 1 is a schematic view of a general leak inspection method. In FIG. 1, a leak inspection of a HEPA filter 20 arranged on a ceiling wall surface 11 of a clean room (not shown) is performed. It is to be noted that the HEPA filter is used in FIG. 1, but any other filter such as a ULPA filter may be used. In FIG. 1, the lower side of the HEPA filter 20 corresponds to the inside of the clean room. In the leak inspection, first, in a state where an air supply device (not shown) is operated, a suction probe 31 of a leak inspection device 30 is arranged on a downstream side 12 (the lower side in the drawing) of the HEPA filter 20. The quantity of fine particles (fine particles which have leaked from the filter) sucked from a suction opening opened in an upper portion of this suction probe 31 is detected by a particle counter 32 which is a fine particle detector of the leak inspection device.

Then, detection fine particles, e.g., fine particle-containing aerosol 40 such as PAO (polyalphaolefin) are supplied to an upstream side 13 (the upper side in the drawing) of the HEPA filter 20 to start the leak inspection. In the leak inspection, a worker (not shown) in the clean room uses the suction probe 31 for scanning at a fixed interval and a fixed speed. In FIG. 1, a single-headed arrow 33 indicates an operating direction of the suction probe 31, and a double-headed arrow 34 indicates a maintained interval between the suction opening of the suction probe 31 and the HEPA filter 20.

Figure 2:
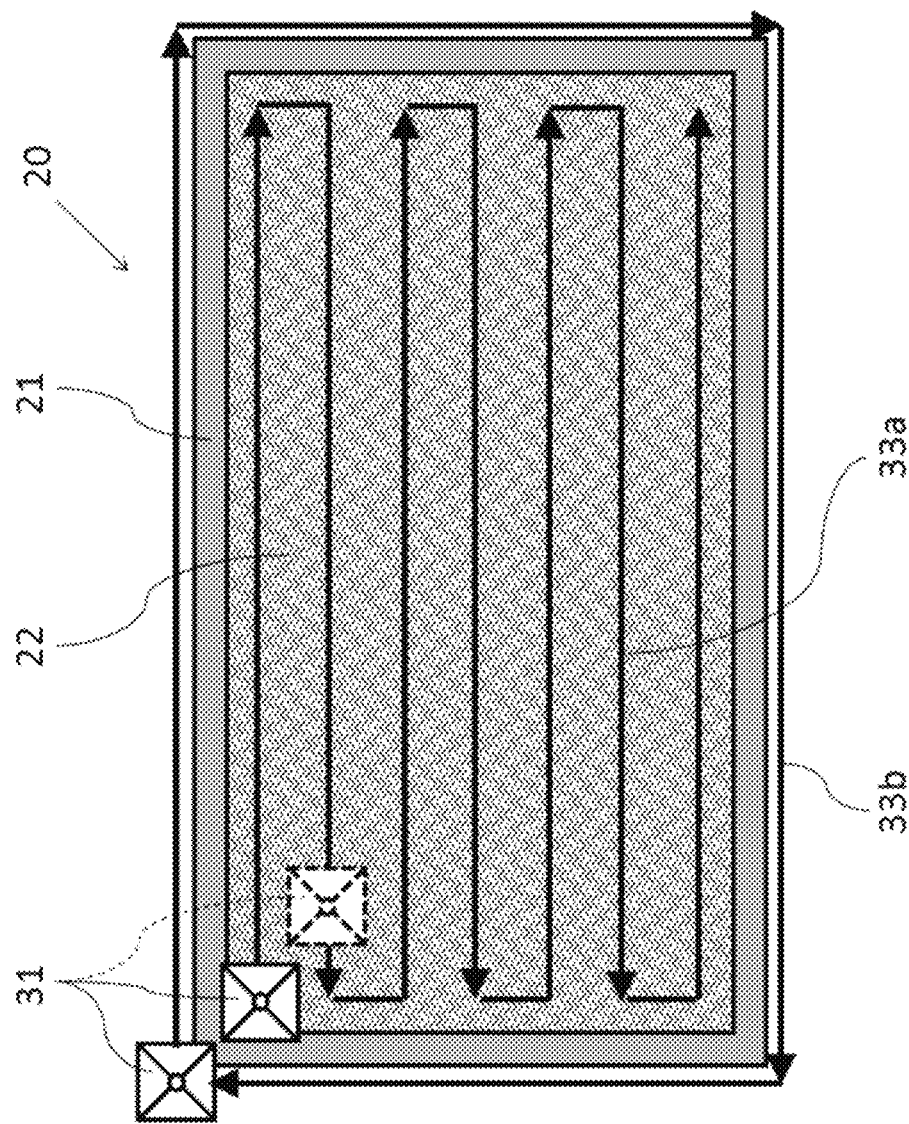
FIG. 2 is a schematic view showing directions along which a suction probe is allowed to scan on a filter material surface of an exhaust-side surface of a filter.

Here, FIG. 2 is a schematic view showing directions along which the suction probe is allowed to scan on a filter material surface of an exhaust-side surface of the filter. In FIG. 2, the HEPA filter 20 is constituted of a rectangular mounting frame 21 and a filter material 22 stretched inside thereof. Although the quantity of HEPA filters 20 installed on the ceiling wall surface or the like of the clean room is designed on the basis of a size of the clean room, the plurality of HEPA filters 20 are aligned and installed on the ceiling wall surface in many cases. Thus, airtightness (presence/absence of a leak) of the mounting frame 21 of the HEPA filter 20 and the adjacent HEPA filters or ceiling wall surface must be also inspected.

Thus, as shown in FIG. 2, a worker moves the suction probe 31 in arrow directions on a scanning line 33a on a surface of the filter material 22 and a scanning line 33b on an outer peripheral portion (an outline of the filter) of the mounting frame 21 to carry out the leak inspection. It is to be noted that intervals between the respective scanning lines 33a and 33b adjacent to each other must be scanned in such a manner that the suction opening (see FIG. 1) of the suction probe 31 slightly overlaps.

Such a leak inspection of the filter, various standards are rigorously set. As such standards, there are standards (IEST-RP-CC006.2) set by Institute of Environmental Science and Technology (IEST), standards (ISO 29463) set by International Organization of Standardization, Japanese Industrial Standards (JIS B9917-3), and the like. In the present invention, feasibility of the leak inspection based on these standards is the premise.

For example, according to the standards of IEST, the particle counter on the upstream side has a suction amount of 0.1 or 0.2 oft/min. (cubic feet/minute) and can detect fine particles having a particle diameter of 0.3 µm or more. On the other hand, the particle counter on the downstream side has a suction amount of 1.0 cft/min. and can detect fine particles having a particle diameter of 0.3 µm or more. Further, a fine particle generation amount on the upstream side is determined as 1,000,000/cf of fine particles whose size is 0.5 µm or more.

Furthermore, the suction probe is moved to come within 25 mm (1 inch) from a measurement surface (a filter surface), and a scanning speed is set to 5 cm/sec. (10 ft/min.) to scan the entire surface. If fine particles of 0.5 µm or more have been continuously detected during the scanning, continuous measurement is performed at this position. If nothing has been continuously detected, adhered dust is determined, and the scanning is carried on. It is to be noted that even the standards of IEST require performing the scanning in such a manner that the suction opening of the suction probe surely overlaps as described above.

In the standards of IEST, there must be no continuously detected region (a continuous count point) indicative of a leak exceeding 0.01% of the quantity of fine particles on the upstream side as a decision criterion of the HEPA filter. For example, when the quantity of fine particles on the upstream side is 1,000,000/cf, 0.01% of this quantity is 100/cf. An allowable quantity of fine particles in this case is 100 (0.5 µm or more).

Figure 3:
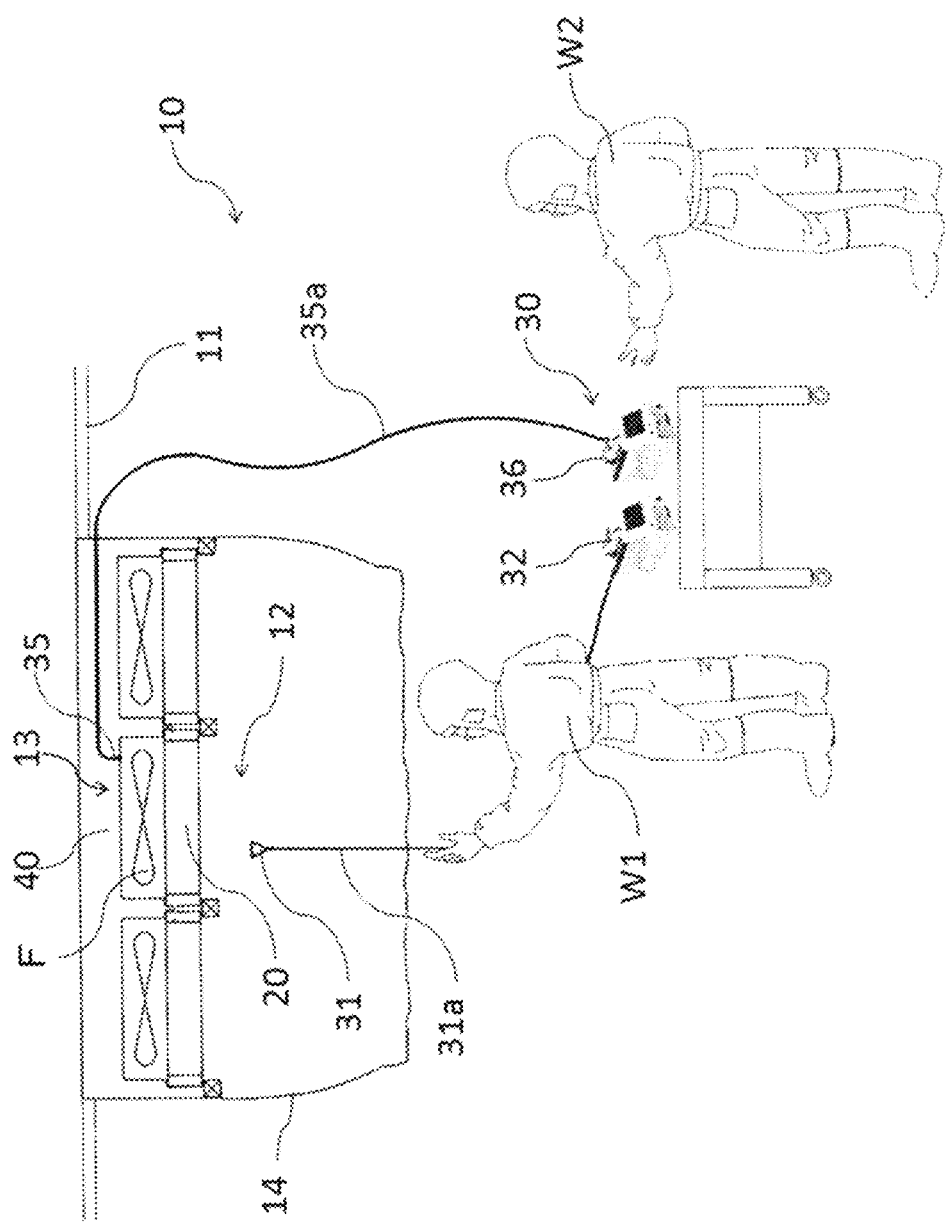
FIG. 3 is a schematic view showing a working state of a conventional leak inspection.

Here, a description will now be given on a work of the leak inspection using the leak inspection device. FIG. 3 is a schematic view showing a working state of a conventional leak inspection. In FIG. 3, there are two workers W1 and W2 in a clean room 10, and they perform a leak inspection of HEPA filters 20 arranged on a ceiling wall surface 11. Moreover, on a downstream side 12 of the HEPA filters 20, curing using a vinyl sheet 14 is effected.

In FIG. 3, an upstream side 13 of the HEPA filters 20 is determined as a primary side, and fine particle-containing aerosol 40 which is PAO (polyalphaolefin) is supplied in a state where air supply devices F are operated. On the other hand, a downstream side 12 of the HEPA filters 20 is determined as a secondary side, and leaked fine particles are detected. In the leak inspection, a leak inspection device 30 is used. The leak inspection device 30 is constituted of two particle counters 32 and 36 which suck fine particles contained in air on the primary side and the secondary side and detect the quantity of fine particles, respectively.

The particle counter 36 on the primary side includes a suction opening 35 which is opened on the primary side and a pipe 35a which couples the suction opening 35 with the particle counter 36. The fine particles on the primary side sucked from the suction opening 35 are supplied to the particle counter 36 through the pipe 35a, and the quantity of the fine particles per unit capacity is detected. The detected quantity of the fine particles is displayed in a monitor of the particle counter 36, and the worker W2 confirms that a predetermined amount of fine particle-containing aerosol 40 is discharged to the primary side.

The particle counter 32 on the secondary side includes a suction probe 31 which scans the secondary side (the downstream side 12) and a pipe 31a which couples the suction probe 31 with the particle counter 32. The suction probe 31 is manually allowed to perform scanning in X-Y axis directions along the filter surface by the worker W1. In this work, as described above, it is important to perform the scanning at a fixed interval and a fixed speed in conformity with the standards of IEST or the like, and an accuracy of the leak inspection greatly depends on experience of the worker W1. The fine particles on the secondary side sucked from the suction probe 31 (the fine particles which have leaked from the filters) are supplied to the particle counter 32 through the pipe 31a, and the quantity of the fine particles per unit capacity is detected. The detected quantity of the fine particles is displayed in a monitor of the particle counter 32, and the worker W2 confirms detection of the fine particles which have leaked to the secondary side.

When the quantity of the fine particles displayed in the monitor of the particle counter 32 exceeds a predetermined reference, the worker W2 who has confirmed this notifies the worker W1 who performs the scanning using the suction probe 31. The worker W1 who has received the notification carries out continuous measurement at a current position of the suction probe 32, determines adhered dust if nothing is continuously detected, and advances the scanning. On the other hand, if there is continuous detection in the continuous measurement, the current position of the suction probe 31 is identified as a leak position. As described above, in the conventional leak inspection work, at least two workers W1 and W2 are required, the worker W1 who performs the scanning using the suction probe 31 needs a great deal of experience.

Figure 4:
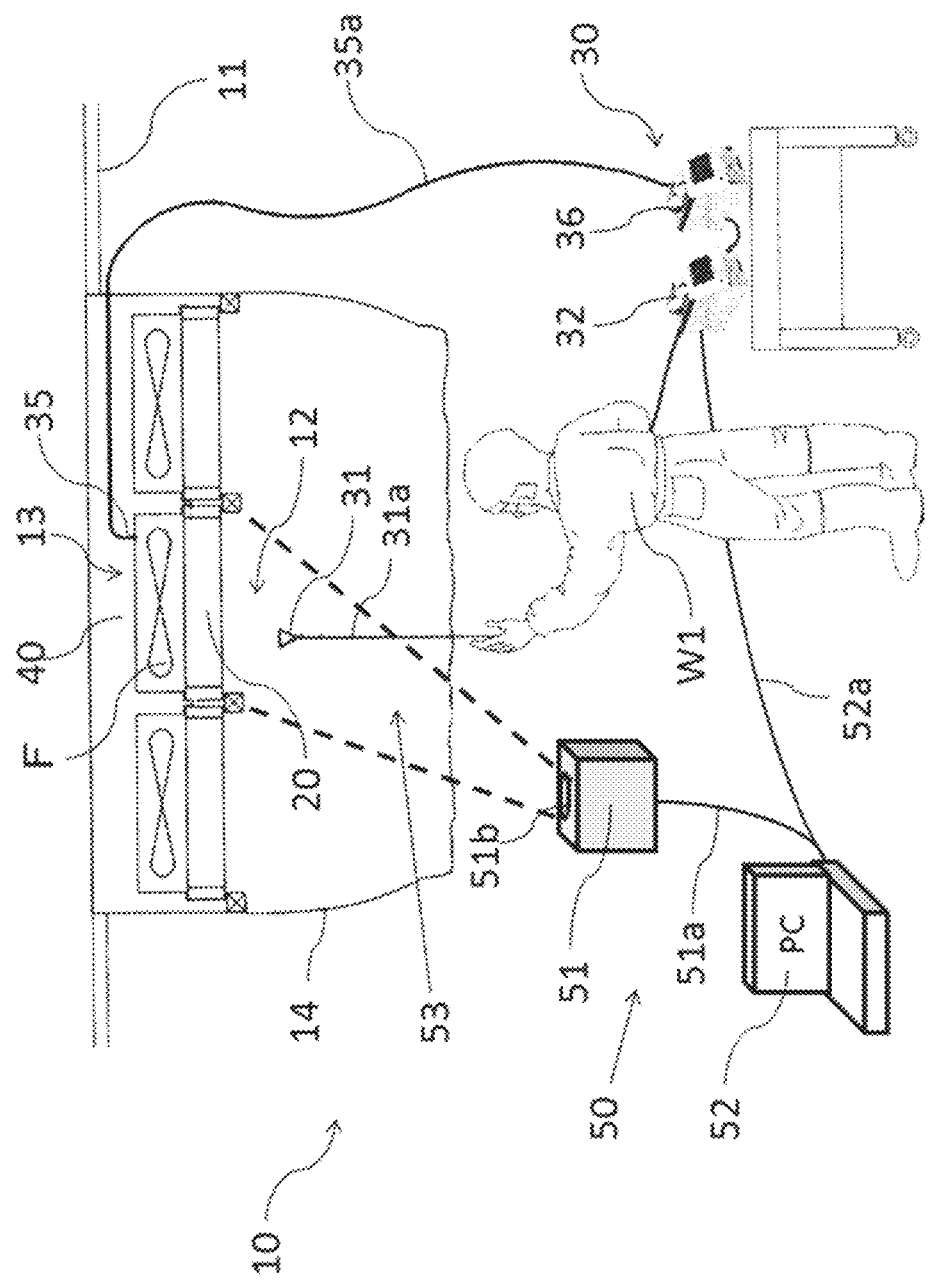
FIG. 4 is a schematic view showing a working state of a leak inspection using a leak inspection assistance device according to the embodiment.

On the other hand, a description will now be given as to a leak inspection work using a leak inspection assistance device according this embodiment as well as the leak inspection device. FIG. 4 is a schematic view showing a working state of the leak inspection using the leak inspection assistance device according to this embodiment. In FIG. 4, there is one worker W1 in a clean room 10, and he/she is performing the leak inspection of HEPA filters 20 arranged on a ceiling wall surface 11. Further, on a downstream side 12 of the HEPA filters 20, curing using a vinyl sheet 14 is effected.

In FIG. 4, an upstream side 13 of the HEPA filters 20 is determined as a primary side, and fine particle-containing aerosol 40 which is PAO (polyalphaolefin) is supplied in a state where air supply devices F are operated. On the other hand, a downstream side 12 of the HEPA filters 20 is determined as a secondary side, and leaked fine particles are detected. In the leak inspection, a leak inspection device 30 and a leak inspection assistance device 50 are used. The leak inspection device 30 is constituted of two particle counters 32 and 36 which suck fine particles contained in air on the primary side and the secondary side and detect the quantity of the fine particles, respectively.

The particle counter 36 on the primary side includes a suction opening 35 which is opened on the primary side (the upstream side 13) and a pipe 35a which couples the suction opening 35 with the particle counter 36. The fine particles on the primary side sucked from the suction opening 35 are supplied to the particle counter 36 through the pipe 35a, and the quantity of the fine particles per unit capacity is detected. The detected quantity of the fine particles is displayed in a monitor of the particle counter 36 and also transmitted to a personal computer 52 (which will be described later) through a connection line 52a as electronic information.

The particle counter 32 on the secondary side includes a suction probe 31 which scans the secondary side (the downstream side 12) and a pipe 31a which couples the suction probe 31 with the particle counter 32. The suction probe 31 is manually allowed to perform scanning in X-Y axis directions along the filter surface by the worker W1 (see FIG. 2). The fine particles on the secondary side sucked from the suction probe 31 (the fine particles which have leaked from the filters) are supplied to the particle counter 32 through the pipe 31a, and the quantity of the fine particles per unit capacity is detected. The detected quantity of the fine particles is displayed in a monitor of the particle counter 32 and also transmitted to the personal computer 52 (which will be described later) through the connection line 52a as electronic information.

On the other hand, the leak inspection assistance device 50 is constituted of a projector 51 which is a projection device and the personal computer 52 which is an information processing device. It is to be noted that the projector 51 may incorporate the information processing device. In FIG. 4, the projector 51 is connected to the personal computer 52 through the connection line 51a. This projector 51 projects a projection image 53 onto a surface of each HEPA filter 20 from a projection window 51b. It is to be noted that contents projected onto the surface of the HEPA filter 20 as the projection image 53 are programed and loaded in the personal computer 52 in advance.

A description will now be given on the projection image 53 which is projected onto the surface of the HEPA filter 20 in the state of FIG. 4. Basic technologies of moving image projection based on projection mapping are applied to a relationship between the projection image 53 programmed in the personal computer 52 and the surface of the HEPA filter 20 onto which this projection image 53 is projected. Here, the projection mapping is a generic term for technologies to project video onto a building, an object, or a space with the use of CG (computer graphics) created by the personal computer and a projection device such as a projector. This is not simple projection called projection but a term formed by adding a term "mapping" thereto, and it is a projection method which has a meaning of pasting video to a projection object and takes on the meaning when the object and the video precisely overlap each other.

Figure 5:
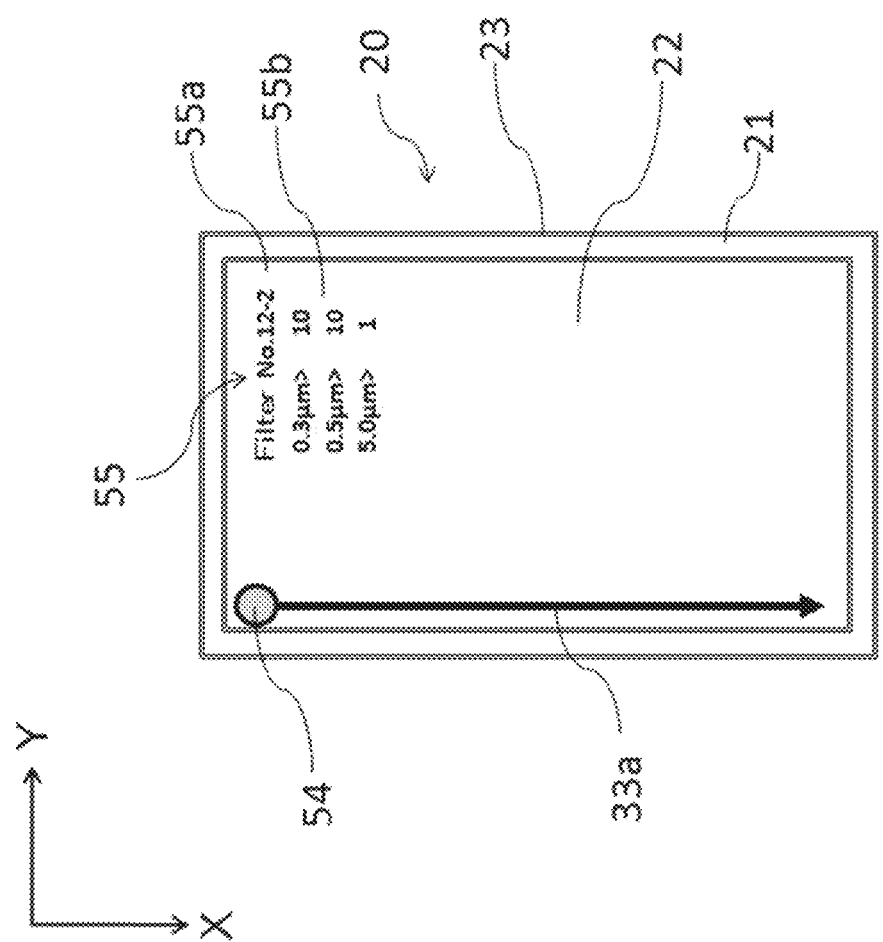
FIG. 5 is a schematic view showing a projection image projected onto the exhaust-side surface of the filter from the leak inspection assistance device according to the embodiment.

In this embodiment, the projection target is a surface of the HEPA filter 20, and the video to be projected is a suction position of the suction probe 31 and fine particle detection information. FIG. 5 is a schematic view showing a projection image projected onto an exhaust-side surface of the filter from the leak inspection assistance device according to this embodiment. In FIG. 5, on the exhaust-side surface (the inner side of the clean room) of the HEPA filter 20, a rectangular mounting frame 21 and a filter material 22 stretched on the inner side thereof are seen. Further, an outer peripheral portion 23 of the mounting frame 21 represents a boundary with adjacent HEPA filters or the ceiling wall surface. Furthermore, a suction point 54 of the suction probe (not shown) and fine particle detection information 55 are projected onto a surface of the filter material 22.

The suction point 54 is projected in such a manner that it moves in the X-Y axis directions parallel to or orthogonal to the mounting frame 21 at a fixed interval and a fixed speed in conformity with the standards of IEST or the like (see FIG. 2). It is to be noted that FIG. 5 shows a part of scanning lines (33a and 33b in FIG. 2) on which the suction point 54 moves.

The fine particle detection information 55 is projected onto a position which can be easily seen from the worker W1 on the surface of the HEPA filter 20. Thus, a projecting position of the fine particle detection information 55 may be changed in accordance with movement of the suction point 54. As the information shown in the fine particle detection information 55, the quantity of the fine particles 55b on the secondary side detected by the particle counter 32 at the current suction point 54 is sequentially displayed. As any other information, a number of a filter 55a which is currently subjected to the leak inspection, the quantity of the fine particles (not shown) on the primary side detected by the particle counter 36, and the like may be displayed. In FIG. 5, the number of the filter and the quantity of the fine particles on the secondary side which have been detected are displayed in accordance with each particle diameter.

Moreover, when the quantity of the fine particles detected by the particle counter 32 exceeds a predetermined reference, an abnormality warning may be shown in the fine particle detection information 55 through the personal computer 52. On the other hand, when the quantity of the fine particles discharged on the primary side is changed due to the detection of the particle counter 36, the abnormality warning may be likewise shown in the fine particle detection information 55 through the personal computer 52. It is to be noted that these warnings may be shown by any other means such as alarm in addition to the display or in place of the display of the fine particle detection information 55.

As described above, when the leak inspection assistance device 50 according to this embodiment is used with the leak inspection device 30 used in the conventional examples, one worker W1 can perform the accurate scanning using the suction probe 31 conforming to the standards of IEST or the like. Consequently, a leak position on the surface of the filter or the mounting portion can be accurately identified. Additionally, workers of the leak inspection do not require special technologies or a great deal of experience.

A description will now be given as to a method for adapting the projection image 53 projected from the projection window 51b of the projector 51 to the surface of the HEPA filter 20. Specifically, an outline of the scanning line shown in the projection image 53 (the scanning line 33b in FIG. 2) is projected in conformity to an outline of the HEPA filter 20 (the outer peripheral portion 23 in FIG. 5). In the present invention, a method for adapting them is not restricted in particular, and a projection correcting method of the projector may be adopted. Further, basic technologies based on the projection mapping may be used. As their examples, the following respective examples will be described.

EXAMPLE 1

In this Example 1, a description will be given on a method for adapting the projection image 53 to the surface of the HEPA filter 20 by using a projection correcting function of the leak inspection assistance device 50 in the configuration of the leak inspection device 30 and the leak inspection assistance device 50 shown in FIG. 4.

In the leak inspection assistance device 50, the projection image 53 which is projected from the projector 51 is programed and loaded in the personal computer 52 in advance. When information such as a number of the HEPA filter which is to be subjected to the leak inspection, a longitudinal/lateral size, a size of the mounting frame, a size of the suction opening of the suction probe, and the like is input to this program, settings and arrangement of the scanning lines 33a and 33b of the projection image 53, a speed of the suction point 54, and the like are set.

Figure 6:
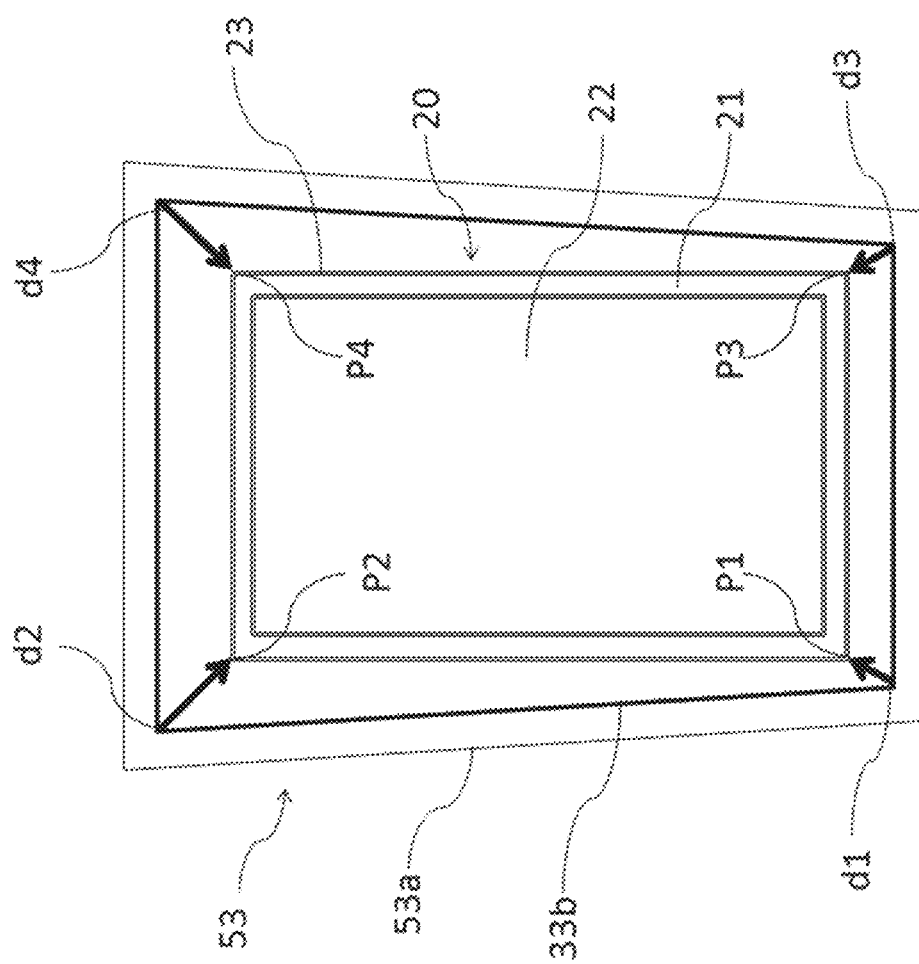
FIG. 6 is a schematic view showing how a positional relationship between a projection device and a surface of the filter is corrected by a projection correcting function in Example 1.

FIG. 6 is a schematic view showing how a positional relationship between the projection device and the surface of the filter is corrected by the projection correcting function in this Embodiment 1. FIG. 6 shows how the exhaust-side surface of the HEPA filter 20 arranged on the ceiling wall surface of the clean room is seen from a floor surface side of the clean room (immediately below the HEPA filter 20). It is to be noted that FIG. 6 shows one HEPA filter 20 alone and HEPA filters adjacent to the periphery (upper, lower, left, and right sides in the drawing) of this HEPA filter 20 or the ceiling wall surface is omitted. Thus, one HEPA filter 20 is in contact with the HEPA filters or the ceiling wall surface adjacent thereto on the outer peripheral portion 23 of the mounting frame 21, this boundary is a mounting portion of the HEPA filter 20, and the leak inspection must be carried out in this portion.

Further, in FIG. 6, the projection image 53 is projected so as to overlap the surface of the HEPA filter 20. This projection image 53 has a substantially trapezoidal shape larger than the filter surface, and it does not conform with the surface of the HEPA filter 20. If the projection window 51b of the projector 51 is immediately below the HEPA filter 20, the projection image 53 has a rectangular shape and can conform with the surface of the HEPA filter 20, but this is realistically difficult. In FIG. 6, the projector 51 is placed on the front lower side of the drawing.

Therefore, since a position of the projector 51 is not immediately below the HEPA filter 20 but deviates from it, the projection image 53 has the trapezoidal shape or the simple quadrangular shape and does not conform with the surface of the HEPA filter 20. Thus, the projection image 53 projected onto the ceiling wall surface of the clean room must be adapted to the surface of the HEPA filter 20.

Here, in the projection image 53 projected onto the ceiling wall surface of the clean room, the scanning line 33b (see FIG. 2) to perform the leak inspection to the outer peripheral portion 23 (the boundary with the adjacent HEPA filters or ceiling wall surface) of the mounting frame 21 of the HEPA filter 20 is set. In FIG. 6, this scanning line 33b also forms a substantially trapezoidal shape along an outer peripheral frame 53a of the projection image 53. Thus, the projection correcting function of the leak inspection assistance device 50 is used to perform the correction in such a manner that an outline (the outer peripheral portion 23 of the mounting frame 21) of the HEPA filter 20 arranged on the ceiling wall surface of the clean room conforms with an outline (the scanning line 33b) of the scanning line shown in the projection image 53.

Specifically, in FIG. 6, the projection image 53 is corrected to move four corner portions d1, d2, d3, and d4 of the scanning line 33b to positions of four corner portions P1, P2, P3, and P4 of the outer peripheral portion 23 of the HEPA filter 20. As this moving mechanism, a correcting function of the projector 51 may be used, or a function of projection mapping which is a program loaded in the personal computer 52 may be used.

In a state where the outline (the scanning line 33b) of the scanning line shown in the projection image 53 projected onto the surface of the HEPA filter 20 from the projection window 51b of the projector 51 is projected in conformity with the outline (the outer peripheral portion 23 of the mounting frame 21) of the HEPA filter 20 as described above, the suction point 54 of the suction probe 31 is projected so as to move at a fixed interval and a fixed speed on the surface of the HEPA filter 20 in the X-Y axis directions parallel or orthogonal to the mounting frame 21 (see FIG. 2).

Furthermore, since the substantially trapezoidal projection image 53 is corrected into the rectangular shape, the leak inspection assistance device 50 can detect how much the position of the projection 51 deviates from the position immediately below the HEPA filter 20. The projection image 53 may be corrected in accordance with a degree of this deviation so that a scanning speed of the suction point 54 projected onto the surface of the HEPA filter 20 becomes constant. It is to be noted that, if the scanning speed of the suction point 54 has a deviation which is within ±10% of a set value due to the deviation of the position of the projector 51 from the position of the HEPA filter 20, the projection image 53 does not have to be corrected.

EXAMPLE 2

In this Example 2, a description will be given as to a method for conforming a projection image 53 to a surface of a HEPA filter 20 with the use of a filter position detection device of the leak inspection assistance device 50 in the configuration of the leak inspection device 30 and the leak inspection assistance device 50 shown in FIG. 4.

In the leak inspection assistance device 50, a projection image 53 projected from a projector 51 is programmed and loaded in a personal computer 52 in advance. When information such as a number of the HEPA filter which is to be subjected to the leak inspection, a longitudinal/lateral size, a size of a mounting frame, a size of a suction opening of a suction probe, and the like is input to this program, settings and arrangement of scanning lines 33a and 33b of the projection image 53, a speed of a suction point 54, and the like are set.

Figure 7:
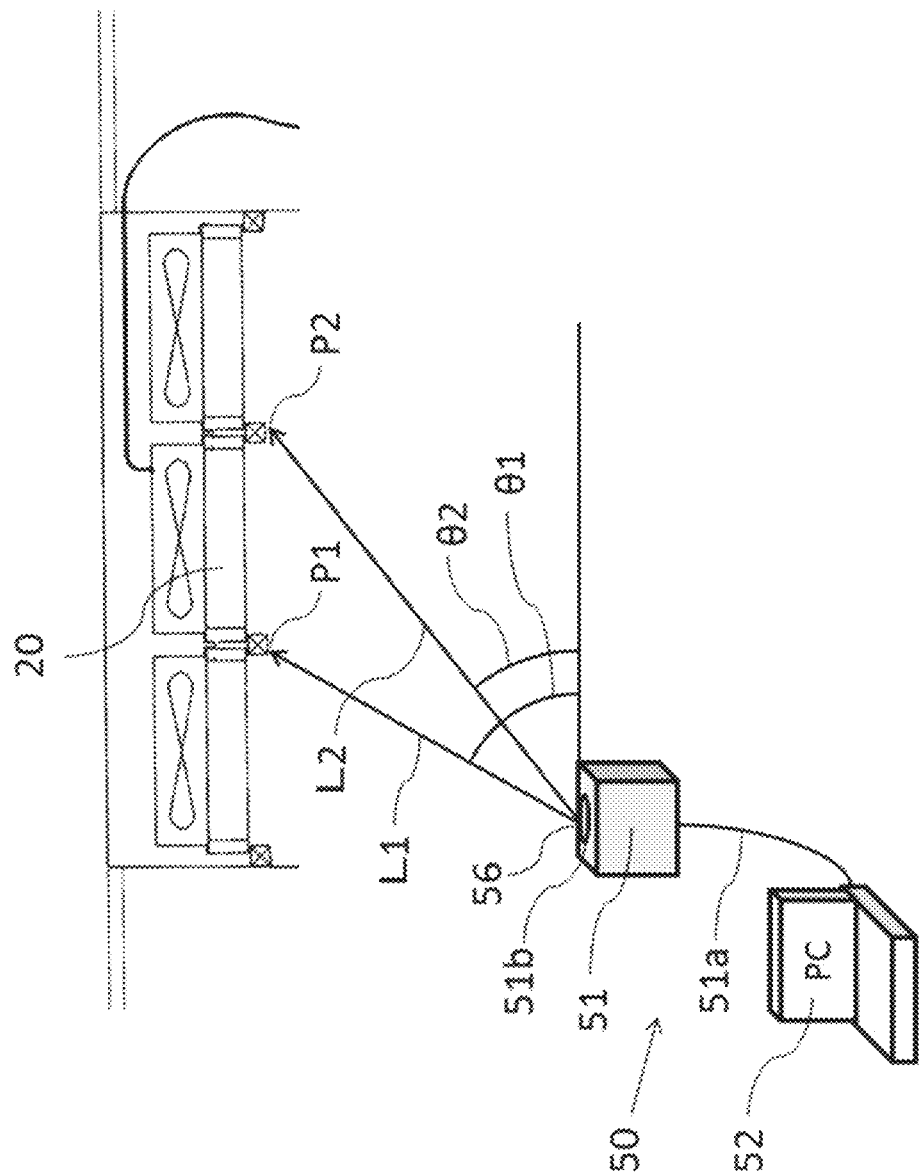
FIG. 7 is a schematic view showing how a positional relationship between the projection device and each region of the filter is detected by a filter position detection device in Example 2.

FIG. 7 is a schematic view showing how a positional relationship between the projection device and each region of the filter is detected by the filter position detection device in this Example 2. FIG. 7 shows how a positional relationship between the HEPA filter 20 arranged on a ceiling wall surface of a clean room and the projector 51 placed on a floor surface is seen from a side surface. It is to be noted that, in FIG. 7, since a position of the projector 51 is not directly below of the HEPA filter 20 but deviates from it, the projection image 53 from the projector 51 has a trapezoidal shape or a simple quadrangular shape, and it does not conform to a surface of the HEPA filter 20 (not shown). Thus, the projection image 53 projected onto the ceiling wall surface of the clean room must be adapted to the surface of the HEPA filter 20.

In FIG. 7, the projector 51 incorporates the filter position detection device 56 and has a part of this device arranged at a position where it is contact with a projection window 51b. The filter position detection device 56 detects distances and direction angles (vertical direction angles and horizontal direction angles) from the projection window 51b to four corner portions P1, P2, P3, and P4 (see FIG. 6) of an outer peripheral portion 23 of the HEPA filter 20. A method for detecting the distances and the direction angles may be any method, and various kinds of sensors or a function of projection mapping may be used.

Specifically, in FIG. 7, a distance L1 from the projection window 51b to one corner portion P1 of the HEPA filter 20 and its vertical direction angle θ1 and horizontal direction angle (not shown) are detected. Moreover, a distance L2 from the projection window 51b to another corner portion P2 of the HEPA filter 20 and its vertical direction angle θ2 and horizontal direction angle (not shown) are detected. Likewise, distances from the projection window 51b to other two corner portions P3 and P4 of the HEPA filter 20 and their vertical direction angles and horizontal direction angles (which are not shown) are detected.

In this manner, the distances from the projection window 51b of the projector 51 to the positions of the four corner portions P1, P2, P3, and P4 (see FIG. 6) of the outer peripheral portion 23 of the HEPA filter and their vertical direction angles and horizontal direction angles are determined. The projection image 53 projected onto the surface of the HEPA filter 20 from the projector 51 is corrected from these detection values by the program loaded in the personal computer 52. In a projecting state where an outline (the scanning line 33b) of a scanning line shown in the projection image 53 projected onto the surface of the HEPA filter 20 from the projection window 51b of the projector 51 is projected in conformity with an outline (the outer peripheral portion 23 of a mounting frame 21) of the HEPA filter 20 as described above, a suction point 54 of a suction probe 31 is projected in such a manner that it moves on the surface of the HEPA filter 20 at a fixed interval and a fixed speed in X-Y axis directions parallel or orthogonal to the mounting frame 21 (see FIG. 2).

Additionally, the projection image 53 may be corrected by the program loaded in the personal computer 52 in such a manner that a scanning speed of the suction point 54 projected onto the surface of the HEPA filter 20 becomes constant in response to correction of the projection image 53. It is to be noted that, when a deviation of the scanning speed of the suction point 54 due to a deviation of a position of the projector 51 from a position of the HEPA filter 20 is within ±10% of a set value, the projection image 53 does not have to be corrected.

As described above, according to this embodiment, it is possible to provide the leak inspection assistance device and the leak inspection method using the same which can use the normal leak inspection device in the leak inspection of filters in a clean room, have a small cost burden since a scanning robot, large-scale equipment, an incidental work, and the like are not required, and enable performing the accurate leak inspection with a small number of workers.

REFERENCE SIGNS LIST

10 . . . inside a clean room, 11 . . . ceiling wall surface, 12 . . . downstream side, 13 . . . upstream side, 14 . . . vinyl sheet, 20 . . . HEPA filter, 21 . . . mounting frame, 22 . . . filter material, 23 . . . outer peripheral portion, 30 . . . leak inspection device, 31 . . . suction probe, 32 and 36 . . . particle counter, 33 . . . single-headed arrow (operating direction), 34 . . . double-headed arrow (maintained interval), 33a and 33b . . . scanning line, 35 . . . suction opening, 31a and 35a . . . pipe, 40 . . . fine particle-containing aerosol, 50 . . . leak inspection assistance device, 51 . . . projector, 51a and 52a . . . connection line, 51b . . . projection window, 52 . . . personal computer, 53 . . . projection image, 53a . . . outer peripheral frame, 54 . . . suction point, 55 . . . fine particle detection information, 55a . . . number of a filter, 55b . . . quantity of fine particles, 56 . . . filter position detection device, L1 and L2 . . . distance, θ1 and θ2 . . . direction angle, P1 to P4 . . . corner portions of an outer peripheral portion of a filter, d1 to d4 . . . corner portions of a scanning line, F . . . air supply device, and W1 and W2 . . . workers.

The invention claimed is:

1. A leak inspection assistance device for use in a leak inspection of one or more filters in a working chamber, wherein the one or more filters are provided on a ceiling wall surface or a sidewall surface of such working chamber and clean air is fed from or exhausted to an external environment, the leak inspection assistance device comprising a projection device that has a projection window and that
a) is directly or indirectly mounted on a floor surface of the working chamber;
b) comprises projection-correcting means for correcting a positional relationship between the projection device and a surface of said one or more filters;
c) is configured to project a suction point of a suction probe onto a surface of each of the one or more filters in such a manner as to move the suction point along a scanning line in X-Y axes directions along the surface of the one or more filters at fixed intervals and a fixed speed, the suction probe being adjunct to the leak inspection device that performs the leak inspection, the X-Y axes directions being orthogonal to each other; and
d) is configured to project the suction point onto the surface of the one or more filters when an outline of the scanning line, shown in a projection image projected by the projection device onto the surface of the one or more filters from the projection window, of the projection device is conformed to an outline of the one or more filters filter by operation of the projection-correcting means.

2. The leak inspection assistance device according to claim 1, comprising a fine particle detector adjunct to the leak inspection device, wherein said fine particle detector is configured to detect leak, and further configured to project leak information onto the surface of the one or more filters through the projection device.

3. A leak inspection assistance device for use in a leak inspection of one or more filters in a working chamber, wherein the one or more filters are provided on a ceiling wall surface or a sidewall surface of such working chamber and clean air is fed from or exhausted to an external environment, the leak inspection assistance device comprising:
a projection device that has a projection window and that
a) is directly or indirectly mounted on a floor surface of the working chamber; and
b) is configured to project a suction point of a suction probe onto a surface of each of the one or more filters in such a manner as to move the suction point along a scanning line in X-Y axes directions along the surface of the one or more filters at fixed intervals and a fixed speed, the suction probe being adjunct to the leak inspection device that performs the leak inspection, the X-Y axes directions being orthogonal to each other;
a filter position detection device configured to detect a positional relationship between said projection device and the surface of said one or more filters;

an information processing device configured (a) to calculate directions and distances from the projection window to respective positions on an outline of the one or more filters from said positional relationship, and (b) to perform correction of a projection image projected by the projection device onto the surface of the one or more filters to conform an outline of the scanning line shown in the projection image to the outline of the one or more filters, wherein the projection device is configured to project the suction point onto the surface of the one or more filters when said outline of the scanning line is conformed to the outline of the one or more filters filter by operation of the image processing device.

4. The leak inspection device of claim 3, comprising a fine particle detector adjunct to the leak inspection device, wherein said fine particle detector is configured to detect leak, and further configured to project leak information onto the surface of the one or more filters through the projection device.

5. A leak inspection method for performing a leak inspection of one or more filters with the use of a leak inspection device in a working chamber, wherein the one or more filters are provided on a ceiling wall surface or a sidewall surface of the working chamber and clean air is fed from or exhausted to an external environment, the leak inspection device comprising:
  a fine particle detector, and
  a suction probe connected to the fine particle detector and a projection device, which projection device is directly or indirectly mounted on a floor surface of the working chamber and includes projection-correcting means for correcting a positional relationship between the projection device and a surface of a chosen filter from the one or more filters;

the method comprising:
  with the use of the projection device, projecting the projection image onto the surface of the chosen filter such that an outline of a scanning line, contained in the projection image, conforms to an outline of the chosen filter;
  scanning said surface of the chosen filter with the use of the suction probe in such a manner as to move a suction point, projected onto the surface of the chosen filter, along said surface in X-Y axes directions orthogonal to each other at fixed intervals and a fixed speed; and
  tracking said scanning with the suction probe.

6. The leak inspection method of claim 5, comprising detecting a leak with a fine particle detector adjunct to the leak inspection device, and projecting leak information onto the surface of the one or more filters through the projection device.

7. A leak inspection method for performing a leak inspection of one or more filters with the use of a leak inspection device in a working chamber, wherein the one or more filters are provided on a ceiling wall surface or a sidewall surface of the working chamber and clean air is fed from or exhausted to an external environment, the leak inspection device comprising:
  a fine particle detector, and a suction probe connected to the fine particle detector;
  a projection device having a projection window and configured to project a suction point onto a surface of a chosen filter from the one or more filters,
  a filter position detection device configured to detect a positional relationship between said projection device and the surface of the chosen filter;
  an information processing device configured (a) to calculate directions and distances from the projection window to respective positions on an outline of the one or more filters from said positional relationship, and (b) to perform correction of a projection image projected by the projection device onto the surface of the one or more filters to conform an outline of the scanning line shown in the projection image to the outline of the one or more filters, the method comprising:
  with a filter position detection device, detecting the positional relationship between the projection device and the surface of the chosen filter;
  with the use of the information processing device, calculating said directions and distances from the projection window to respective positions on the outline of the chosen filter based on said positional relationship;
  with the use of the projection device, projecting the projection image onto the surface of the chosen filter;
  with the use of the information processing device, performing correction of the projection image to conform the outline of the scanning line, contained in the projection image, to the outline of the chosen filter;
  when said outline of the scanning line is conformed to the outline of the chosen filter,
    (i) scanning said surface of the chosen filter with the use of the suction probe in such a manner as to move the suction point, projected onto the surface of the chosen filter, along said surface in X-Y axes directions orthogonal to each other at fixed intervals and a fixed speed, and
    (ii) tracking said scanning with the suction probe.

8. The leak inspection method of claim 7, comprising detecting a leak with a fine particle detector adjunct to the leak inspection device, and projecting leak information onto the surface of the chosen filter through the projection device.

* * * * *